(12) United States Patent
Aoyama

(10) Patent No.: US 7,852,527 B2
(45) Date of Patent: Dec. 14, 2010

(54) IMAGE READER

(75) Inventor: Takeshi Aoyama, Abiko (JP)

(73) Assignee: CANON Kabushiki Kaisha, Tokyo (JP)

( * ) Notice: Subject to any disclaimer, the term of this patent is extended or adjusted under 35 U.S.C. 154(b) by 996 days.

(21) Appl. No.: 11/562,340

(22) Filed: Nov. 21, 2006

(65) Prior Publication Data

US 2007/0139730 A1 Jun. 21, 2007

(30) Foreign Application Priority Data

Dec. 19, 2005 (JP) .............................. 2005-365002

(51) Int. Cl.
*H04N 1/04* (2006.01)

(52) U.S. Cl. .................... 358/498; 358/474; 358/471; 358/400

(58) Field of Classification Search ................ 358/498, 358/474, 471, 400
See application file for complete search history.

(56) References Cited

U.S. PATENT DOCUMENTS

| 4,982,228 A | 1/1991 | Watanabe |
| 5,120,039 A | 6/1992 | Yamada |
| 6,027,108 A * | 2/2000 | Johdai et al. ................ 271/3.02 |
| 2002/0008352 A1* | 1/2002 | Hanano ....................... 271/273 |

FOREIGN PATENT DOCUMENTS

| JP | 64-053963 A | 3/1989 |
| JP | 3-107176 A | 5/1991 |
| JP | 3-138249 A | 6/1991 |

* cited by examiner

*Primary Examiner*—Benny Q Tieu
*Assistant Examiner*—Martin Mushambo
(74) *Attorney, Agent, or Firm*—Canon USA, Inc. IP Division

(57) ABSTRACT

An image reader is provided which includes a document reader unit having a document stand configured for placing a document to be read thereon; a document conveying unit removably positioned on top of the document reader unit, wherein the document conveying unit is configured for conveying the document to be read onto the document stand; a discharge tray configured to receive a read document thereon conveyed by the document conveying unit; and a restriction member movably positionable between the document stand and the discharge tray, wherein the restriction member is configurable in an upright orientation for restricting the position of an end of the read document placed on the discharge tray.

6 Claims, 5 Drawing Sheets

IMAGE READER

BACKGROUND OF THE INVENTION

1. Field of the Invention

The present invention relates to an image reader for reading document images.

2. Description of the Related Art

FIG. 5 illustrates a portion of a conventional image reading apparatus which includes a document conveying unit 192 for conveying documents. The conveying unit 192 is usually positioned above a reader unit 191 having a document stand 901 for placing a document thereon. A document conveyed by the conveying unit is discharged onto a discharge tray 201 which is attached to the reader unit 191.

Some example of conventional copying apparatuses which utilize document conveying units that convey a document on a document tray to a document stand and then discharges it onto the document tray include Japanese Patent Laid-Open Nos. H03-107176, H01-053963 and H03-138249.

In order to increase the number of documents to be placed on the discharge tray 201, the height of a trailing end wall 202 for restricting the trailing end position of the document placed on the discharge tray 201 may be upwardly increased. That is, as shown in FIG. 5, by elongating the trailing end wall 202 close to a document outlet 921 of the document conveying unit 192, the number of placeable documents may be increased. When a document 906 placed on a document stand 901 is such large-sized that the document 901 exceeds the trailing end wall 202, the following problems arise. When the document conveying unit 192 is closed so as to come close to a document reader 191 after a large-sized document 906 is placed on the document stand 901, the large-sized document 906 is pinched between the document conveying unit 192 and the trailing end wall 202, resulting in the document 906 being bent and/or damaged.

With the apparatus in Japanese Patent Laid-Open No. H03-138249 (see P4, FIG. 3 ), for instance, since when a document is conveyed onto the document stand, a conveying belt is rotated in a direction opposite to that when being discharged onto the document tray from the document stand, the productivity is decreased. Also, when a document is conveyed from the document tray, a document is discharged onto the document tray, so that the document matching is deteriorated, causing the document to frequently malfunction in conveying.

Therefore, in light of the aforementioned deficiencies in the existing conventional image reading systems, it would be desirable to provide an image reading apparatus configured such that it prevent a document from being bent and damaged.

SUMMARY OF THE INVENTION

Accordingly, the present invention provides an image reader which is configured to prevent a document from being bent and damaged.

According to an aspect of the present invention, an image reader is provided which includes a document reader unit having a document stand configured for placing a document to be read thereon; a document conveying unit removably positioned on top of the document reader unit, wherein the document conveying unit is configured for conveying the document to be read onto the document stand; a discharge tray configured to receive a read document thereon conveyed by the document conveying unit; and a restriction member movably positionable between the document stand and the discharge tray, wherein the restriction member is configurable in an upright orientation for restricting the position of an end of the read document placed on the discharge tray.

According to another aspect of the present invention, the reader may further include an urging member configured to urge the restriction member in the upright orientation; and a stopper configured to stop movement of the restriction member once the restriction member is positioned in the upright orientation.

According to yet another aspect of the present invention, when the document conveying unit is closed for holding down the document placed on the document stand, the restriction member is moved due to the document being placed on the document stand against an urging force of the urging member. Moreover, according to another aspect of the present invention, the discharge tray is provided in the document reader unit, and the restriction member is movably supported to the document reader unit.

Moreover, according to still yet another aspect of the present invention, the reader may also include an actuation unit configured to move the restriction member between the upright orientation, and a stowed away orientation which does not restrict the position of the end of the document placed on the discharge tray; and a control unit configured to control the actuation unit so as to move the restriction member to the stowed away orientation during non-operation of the document conveying unit.

Furthermore, according to yet another aspect of the present invention, the restriction member is movable from a restriction position blocking off a space between an upper surface of the document stand and the discharge tray for restricting the position of the end of the document placed on the discharge tray in a direction communicating the upper surface of the document stand with the discharge tray.

Additionally, according to another aspect of the present invention, a document reader unit having a document stand configured for placing a document with images to be read thereon; a document conveying unit frame including a rotational body configured for conveying a document, wherein the rotational body is removably positioned on top of the document reader unit so as to cover the document stand, wherein an outlet is formed at an end of the document conveying unit frame for discharging the document conveyed by the rotational body; a discharge tray integrated into the document reader unit for receiving the document conveyed by the rotational body; and a restriction member movably arranged in the document reader unit and configured for (1) restricting the position of an end of the document placed on the discharge tray at a restricting position close to the end of the document conveying unit frame at which the outlet is formed, and (2) being arranged such that the restriction member moves from the restricting position in a direction away from the end of the document conveying unit frame.

Moreover, according to yet another aspect of the present invention, wherein the restricting member at the restriction position blocks off a space between an upper surface of the document stand and the discharge tray, and the restriction member is arranged such that the restriction member leaves the space unobstructed.

Accordingly, the number of bent or damaged documents can be reduced while the number of document sheets placeable on the discharge tray being increased.

Further features and aspects of the present invention will become apparent from the following description of exemplary embodiments with reference to the attached drawings.

DESCRIPTION OF THE EMBODIMENTS

First Exemplary Embodiment

Figure 1:
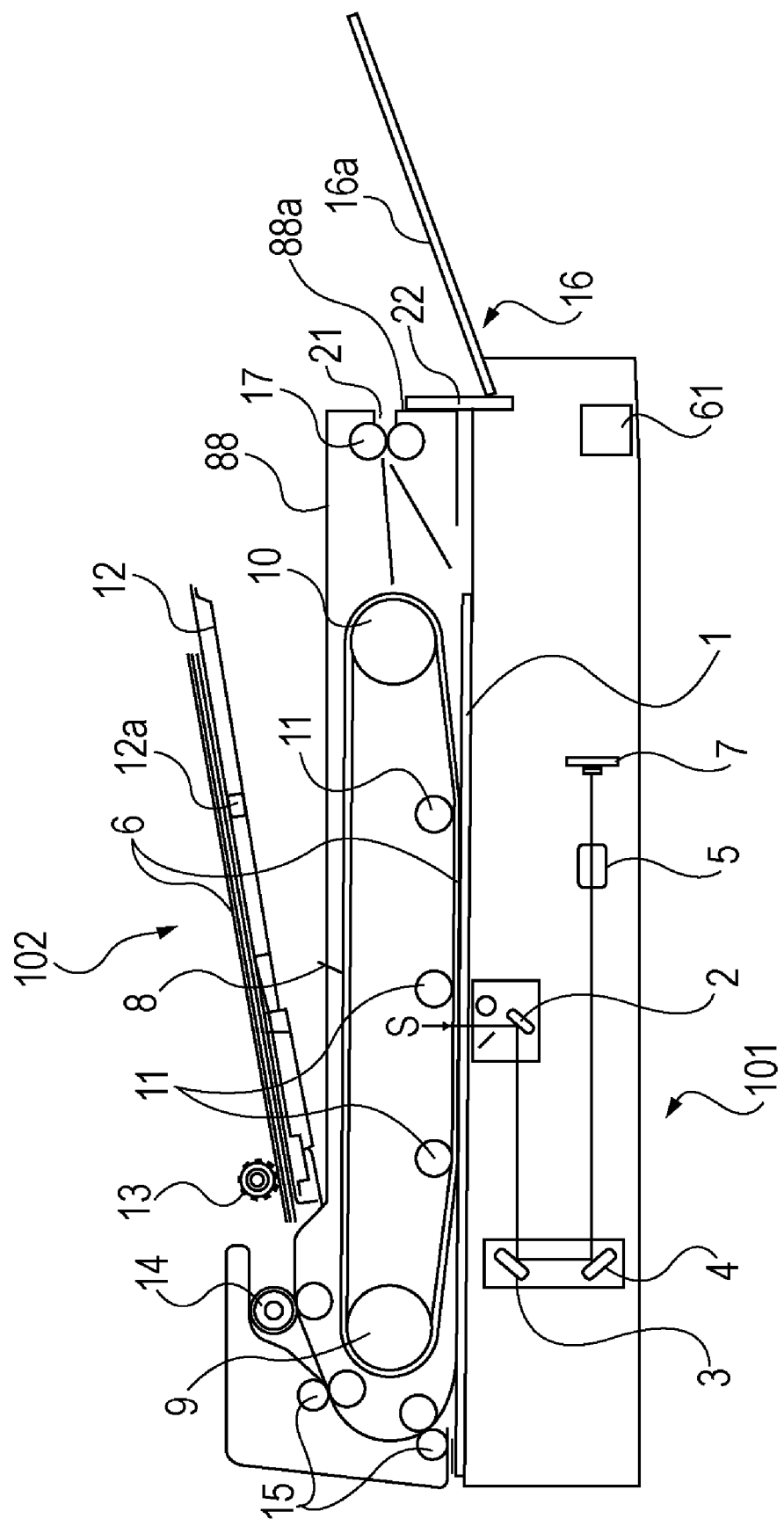
FIG. 1 is a sectional view of an exemplary digital scanner according to an aspect of the present invention.
Figure 2:
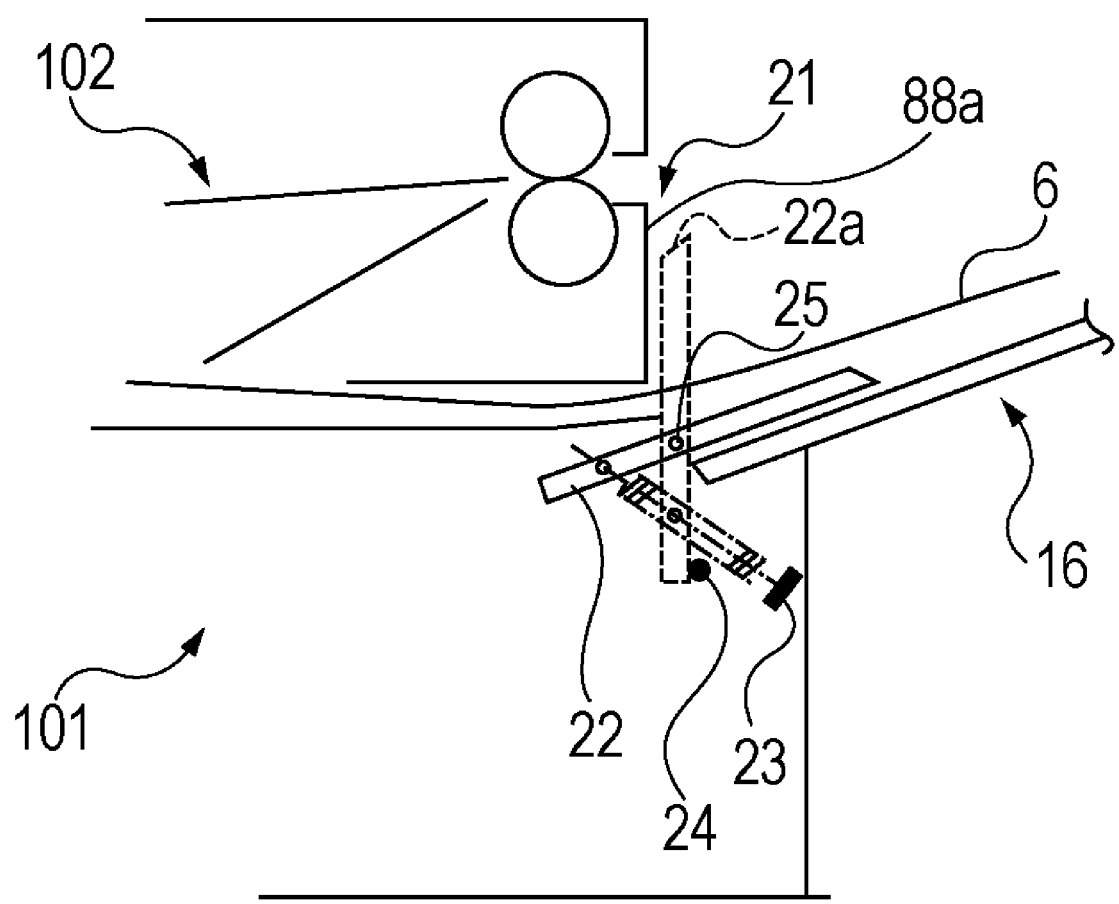
FIG. 2 is a detailed structural view of an exemplary portion of the digital scanner according to an aspect of the present invention.

FIG. 1 is a sectional view showing a schematic structure of an exemplary digital scanner as an image reader incorporating the present invention; FIG. 2 is a detailed sectional view for illustrating the vicinity of a discharge tray; and FIG. 3 is a perspective view of the digital scanner.

The digital scanner includes a document conveying unit 102 for placing a document thereon and a document reader unit 101, having a document stand 1 arranged thereon, for reading images of the document.

Figure 3:
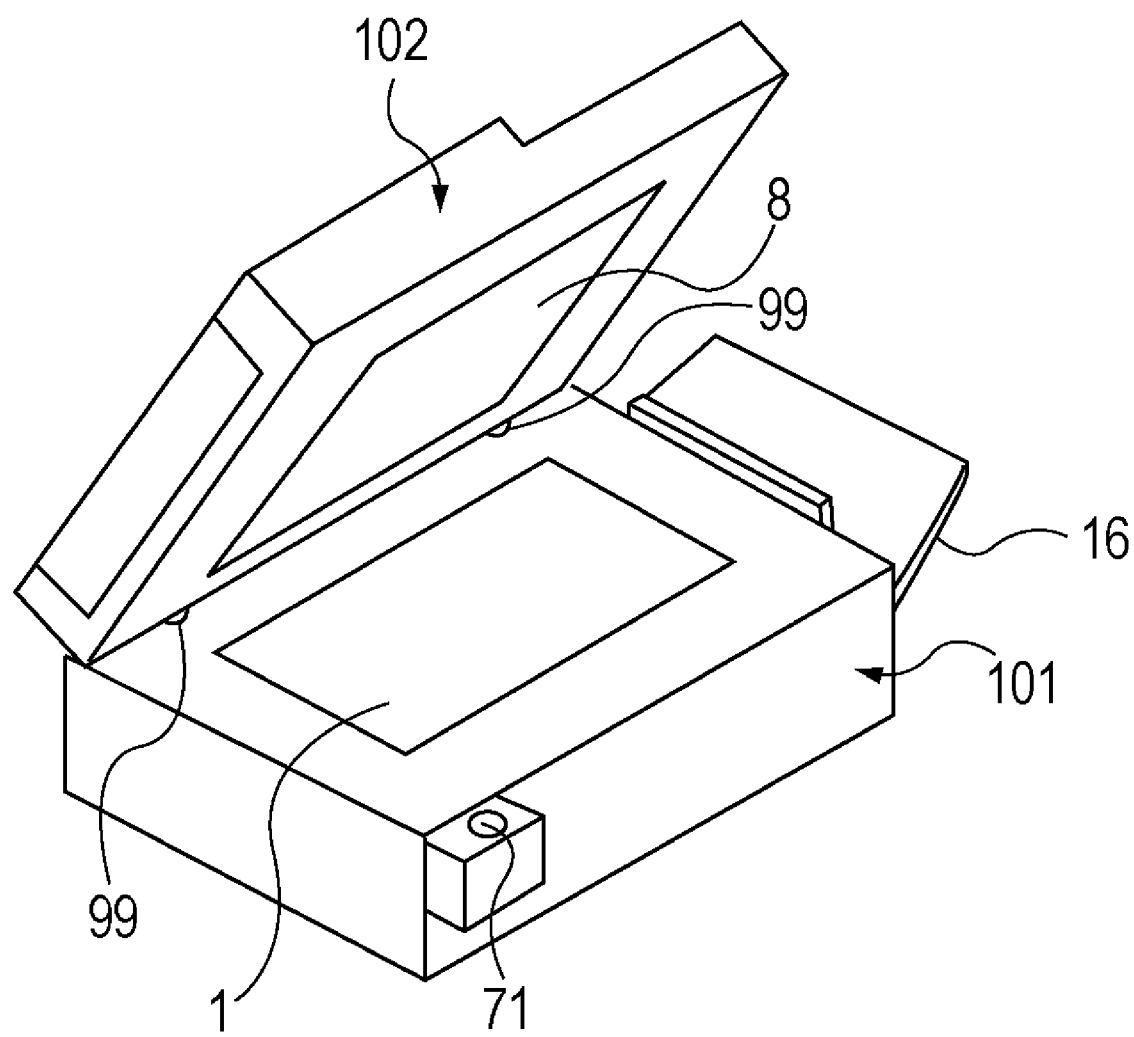
FIG. 3 is a perspective view of the exemplary digital scanner according to an aspect of the present invention.

As shown in FIG. 3, the document conveying unit 102 is openably/closably supported to the document reader unit 101 via a hinge 99 such that the document stand 1 can be exposed/closed. A discharge tray 16 is attached to the document reader unit 101. The discharge tray 16 is supported to the document reader unit 101 independently of the document conveying unit 102. On the discharge tray 16, a document conveyed by the document conveying unit 102 is placed.

A document stand 1 made of transparent glass is arranged in the document reader unit 101. When the document conveying unit 102 is opened relatively to the document reader unit 101, the document stand 1 is exposed (see FIG. 3). When the document conveying unit 102 is closed relatively to the document reader unit 101, a document placed on the document stand 1 can be held down by the document conveying unit 102.

Below the document stand 1, a first mirror 2, a second mirror 3, a third mirror 4, and a lens 5 are arranged. The first mirror 2, the second mirror 3, the third mirror 4, and the lens 5 scan images of a document 6 placed on the document stand 1 so as to focus them on a CCD (charge coupled device) 7. Thereby, the digital scanner reads the images of the document.

Within a document conveying unit frame 88 of the document conveying unit 102, a conveying belt 8 is provided as a rotational body. When the document conveying unit 102 is closed, the conveying belt 8 is positioned on the upper surface of the document stand 1. The conveying belt 8 conveys the document 6 onto the document stand 1 as well as discharges the document 6 placed on the document stand 1 therefrom.

The conveying belt 8 is suspended by a drive roller 9 and a follower roller 10, which are arranged to respectively correspond to both ends of the document stand 1. The conveying belt 8 is driven by the rotation of the drive roller 9. Between the drive roller 9 and the follower roller 10, a plurality of pressure rollers 11 are provided for pressing the conveying belt 8 on the document stand 1 by their own weight or springs (not shown). The pressure rollers 11 allow the conveying belt 8 to abut the surface of the document stand 1 so as to securely convey the document 6 along the document stand 1.

On the upstream side of the conveying belt 8, there is provided a document tray 12 capable of placing a number of sheets of the document 6 thereon and a pickup roller 13 for conveying the document 6 on the document tray 12. On the document tray 12, a presence detecting sensor 12a is arranged for detecting the presence of a document on the document tray 12.

In the downstream direction of the pickup roller 13, separation feed rollers 14 are provided for separating the document 6 fed by the pickup roller 13 one by one so as to convey it. On the downstream side of the separation feed rollers 14, conveying rollers 15 are arranged for feeding a document to between the conveying belt 8 and the document stand 1. On the downstream side of the conveying belt 8, discharge rollers 17 are arranged for conveying the document 6 onto the discharge tray 16 from a discharge outlet 21 formed on the side face 88a of the document conveying unit frame 88 (an end of the document conveying unit frame 88). The document discharged by the discharge rollers 17 is placed onto the discharge tray 16. A placing surface 16a formed on the discharge tray 16 is inclined to the horizon.

The document reader unit 101 is provided with a control unit 61 for controlling motions of the mirrors of the document reader unit 101 and the reading operation of the CCD 7. The control unit 61 also controls document conveying operations by the components of the document conveying unit (the pickup roller 13, the separation feed rollers 14, the conveying rollers 15, the conveying belt 8, and the discharge rollers 17). The document reader unit 101 is also provided with a reading start button 71 (see FIG. 3).

FIG. 2 is a drawing of an exemplary detailed structural portion of the vicinity of the discharge tray 16. A shaft 25 provided in the discharge tray 16 supports a trailing end wall 22 rotatably. The trailing end wall 22 is urged by an urging spring 23 in a counterclockwise direction. The trailing end wall 22 urged by the urging spring 23 is normally located at a restriction position abutting a stopper 24 as shown by broken lines. The upper portion of the trailing end wall 22 located at the restriction position extends toward the vicinity of the discharge outlet 21. The restriction position of the trailing end wall 22 is the vicinity of the side face 88a of the document conveying unit frame 88.

At an end of the trailing end wall 22 (adjacent to the document conveying unit 102), an inclination part 22a increasing the contact area between the document 6 and the trailing end wall 22 is formed for preventing the document 6 from being folded when the document 6 touches the wall. The trailing end of the document conveyed to and discharged on the discharge tray 16 is restricted in position by the trailing end wall 22 located at the restriction position.

When the document is read by placing it on the document stand 1, an operator, as shown in FIG. 3, opens the document conveying unit 102 at first so as to place a document on the document stand 1. Then, the operator closes the document conveying unit 102 so as to hold down the document on the document stand 1 with the conveying belt 8 of the document conveying unit 102. Subsequently, the operator pushes down the reading start button 71.

When the reading start button 71 is pushed, the document conveying unit 102 starts reading images of the document. That is, on the basis of the pushing of the reading start button 71, the control unit 61 controls the first mirror 2, the second mirror 3, and the third mirror 4 to move for reading the images of the document by focusing the reflection light from the document on the CCD 7 via the lens 5.

Next, a case will be described where a document placed on the document stand 1 is large-sized and wherein the document exceeds the upper surface of the document reader unit 101.

In a state in which the document conveying unit 102 is separated from the document reader unit 101, an operator places the large-sized document 6 on the document stand 1. Then, the operator allows the document conveying unit 102 to approach the document reader unit 101. If the large-sized document 6 touches the trailing end wall 22 at this time, the document 6 pushes the trailing end wall 22.

More specifically, the trailing end wall 22 is pushed due to the rigidity of the document 6 pinched between the side face 88a of the document conveying unit frame 88 and the trailing end wall 22. The document 6 force causes the trailing end wall 22 to rotate about the shaft 25 clockwise against the urging force of the urging spring 23 while touching the inclination part 22a so as to allow the trailing end wall 22 to lower such that it is in a generally parallel orientation (i.e., flat) with respect to the discharge tray.

The restriction position of the trailing end wall 22 herein is a position blocking off a space between the upper surface of the document stand 1 and that of the discharge tray 16 when the document conveying unit 102 is closed. The trailing end wall 22 located at the restriction position intersects with an extension of the upper surface of the document stand 1. Hence, when the document conveying unit 102 is closed in a state when the large-sized document 6 is placed on the document stand 1, the document 6 is pinched between the document conveying unit 102 and the trailing end wall 22. At this time, the trailing end wall 22 is pushed and moved by the document from the above-mentioned restriction position in a direction aligning the upper surface of the document stand 1 with that of the discharge tray 16 (see FIG. 2). As a result, the movement of the trailing end wall 22 reduces the damage of the document pinched between the document conveying unit 102 and the trailing end wall 22.

Next, the reading image operation while a plurality of documents 6 are being continuously conveyed with the conveying belt 8 will be described. The first mirror 2, the second mirror 3, and the third mirror 4 are moved to and fixed at a position S where images are read in an approximately central portion of the conveying belt 8. Then, the document 6 being conveyed by the document conveying unit 102 is scanned so as to focus it on the CCD 7 for reading it.

When the presence of a document in the document tray 12 is detected by the presence detecting sensor 12a, the control unit 61 controls such that upon the pushing of the reading start button 71, images are read while the document being conveyed by the document conveying unit 102. That is, the control unit 61 controls each element of the document reader unit 101 and the reading operation by the CCD 7 such that the images of the conveyed document are read.

Second Exemplary Embodiment

According to the first exemplary embodiment, the trailing end wall 22 is rotatably supported about the shaft 25; however, in the alternative, the trailing end wall 22 may be supported and slidably moved in parallel so as to have the same effect.

Figure 4:
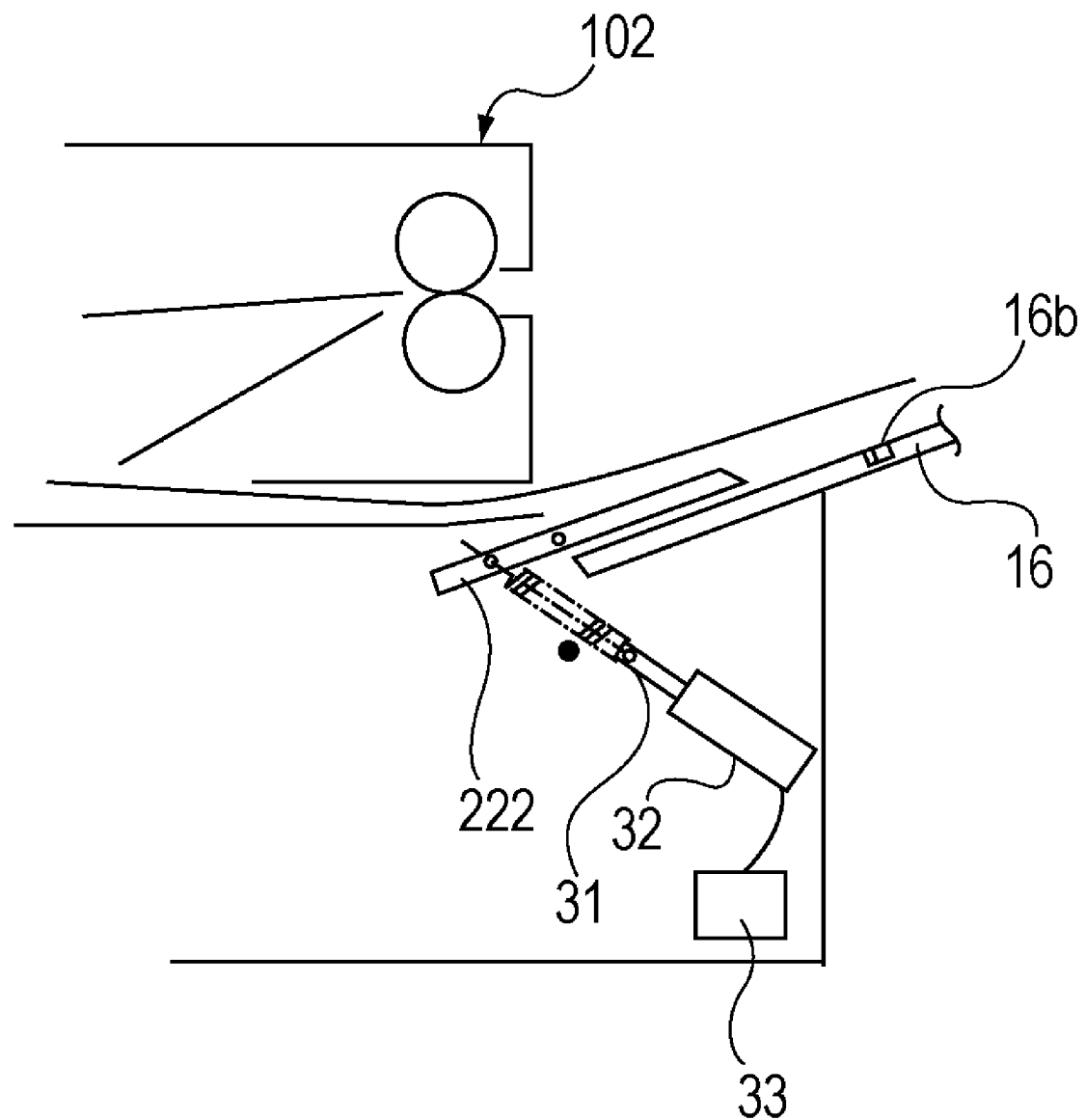
FIG. 4 is a detailed structural view of an exemplary portion of the digital scanner according to another embodiment of the present invention.
Figure 5:
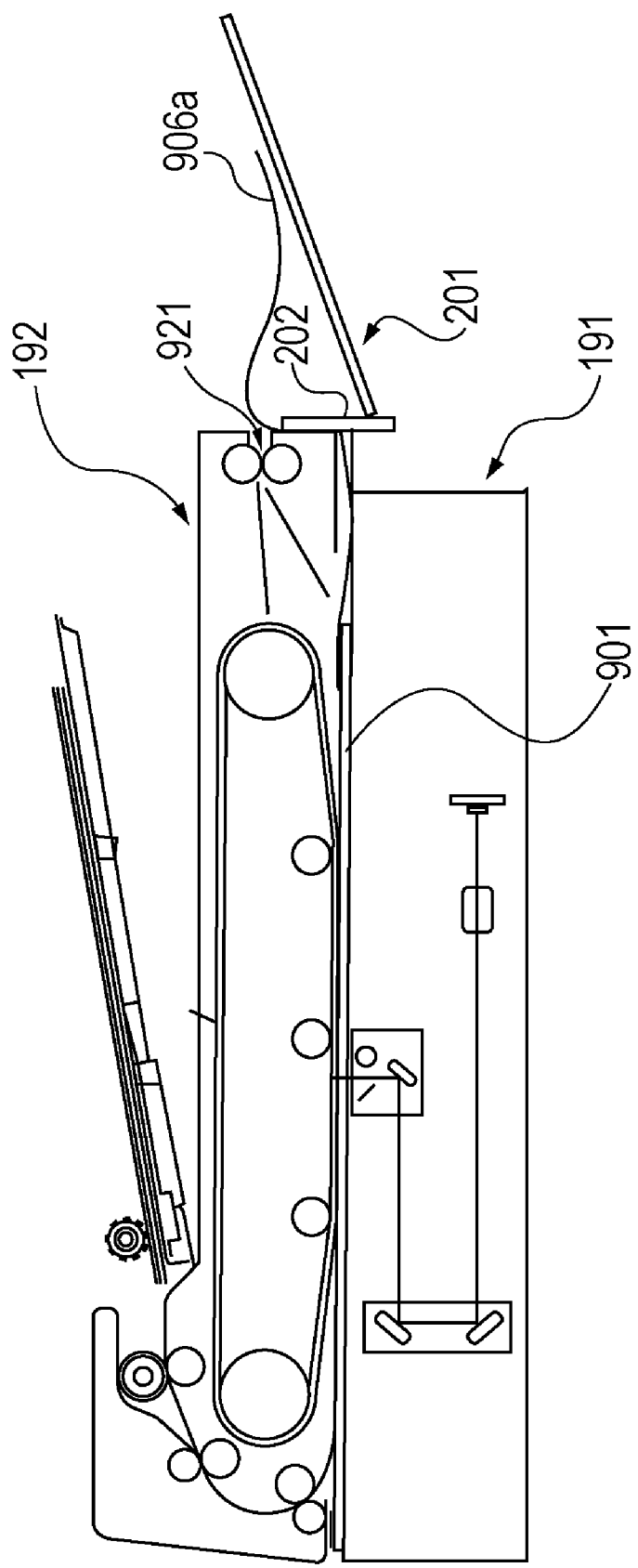
FIG. 5 is a sectional view of a conventional digital scanner.

FIG. 4 is a drawing showing a detailed exemplary structure of a second embodiment. The configurations different from the first embodiment will be described below, and the description of the same configurations as those of the first embodiment will be omitted.

According to the second embodiment, one end of an urging spring 31 is connected to a trailing end wall 222 and the other end is connected to a solenoid 32 as an actuation part. The solenoid 32 is connected to a control unit 33 controlling each element of the document conveying unit 102, the mirrors of the document reader unit 101, and the operation of the CCD 7. The discharge tray 16 is provided with a discharged document presence sensor 16b for detecting the presence of a document on the discharge tray 16.

While the document conveying unit 102 is conveying a document, the control unit 33 rotates counterclockwise the trailing end wall 222 via the urging spring 31 such that the end wall 222 is repositioned in an upright configuration by actuating the solenoid 32. This erected trailing end wall 222 thereby restricts the position of an end of the document placed on the discharge tray 16. At a time other than when the document conveying unit 102 is conveying a document (during non-operation of the document conveying unit 102), the control unit 33 rotates the trailing end wall 222 clockwise so as to allow it lay back down in parallel with the discharge tray 16 by inhibiting the operation of the solenoid 32. By allowing the trailing end wall 222 to slide back into a non-upright position, the protrusion of the trailing end wall 222 from the document reader unit 101 is reduced (the state shown in FIG. 4).

That is, in a state wherein the presence of a document on the document tray 12 is detected by the presence detecting sensor 12a, when the reading start button 71 is pushed, the document conveying unit 102 is operated. Hence, in this case, the control unit 33 controls the movement of the trailing end wall 222 so as to have an upright restriction position by operating the solenoid 32. After completion of the reading operation, upon detecting the absence of a document on the discharge tray 16 by the discharged document presence sensor 16b when an operator brings the document out of the discharge tray 16, the control unit 33 controls the operation of the trailing end wall 222 so as to have an inclined state of the trailing end wall 222 as shown in FIG. 4 by stopping the operating of the solenoid 32 based on the detection.

In a state that the absence of a document on the document tray 12 is detected by the presence detecting sensor 12a, when the reading start button 71 is pushed, the document on the document stand 1 is read without operating the document conveying unit 102. In this case, the document conveying unit 102 is not operated, so that the control unit 33 does not operate the solenoid 32. Since the solenoid 32 is not operated, the trailing end wall 222 is maintained in an inclined state (stowed away). Hence, even when the document conveying unit 102 is closed in a state that a large-sized document is placed on the document stand 1, the trailing end wall 222 has been moved to the inclined position, so that the document is not pinched between the trailing end wall 222 and the document conveying unit 102 (or even when it is pinched, the damage on the document is small).

When the document placed on the document stand 1 is read, the trailing end wall 222 is located at the inclined position, so that in comparison with the first embodiment, a force rotating the trailing end wall 222 is not applied to the document 6, further reducing the effect on the document 6 due to the trailing end wall 22.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-365002 filed Dec. 19, 2005, which is hereby incorporated by reference herein in its entirety.

What is claimed:

1. An image reader, comprising:
   a document reader having a document stand on which a document to be read is placed;
   a document conveying frame removably positioned on top of the document reader unit, wherein the document conveying frame unit is provided with a document conveying portion that is configured to convey a document read by the document reader unit and to discharge the read document from one end of the document conveying frame;
   a discharge tray on which read documents that are discharged by the document conveying portion are stacked;
   a restriction member provided between the document stand and the discharge tray, wherein the restriction member is configured to be positioned at a restricting position for restricting a position of an end of the read documents stacked on the discharge tray; and
   a supporting portion provided on the document reader unit and configured to rotatably support a lower portion of the restriction member,
   wherein, when the restriction member is positioned at the restricting position, the restriction member protrudes upwardly from a height of a top surface of the document reader unit and is located close to the one end of the document conveying frame, and
   wherein the restriction member is rotatably supported by the supporting portion so that the restriction member can rotate from the restricting position in a direction that is away from the one end of the document conveying frame.

2. The image reader according to claim 1, further comprising:
   an urging member configured to urge the restriction member into the restricting position; and
   a stopper configured to stop movement of the restriction member once the restriction member is positioned in the restricting position.

3. The image reader according to claim 2, wherein when the document conveying frame is closed for holding down a document placed on the document stand, the restriction member is moved against an urging force of the urging member due to the document being placed on the document stand.

4. The image reader according to claim 1, further comprising:
   an actuation unit configured to move the restriction member between the restricting position and a stowed away orientation position that does not restrict a position of the end of the read documents stacked on the discharge tray; and
   a control unit configured to control the actuation unit so as to move the restriction member to the stowed away orientation position during non-operation of the document conveying portion.

5. The image reader according to claim 1, wherein the restriction member is movable from the restriction position blocking off a space between an upper surface of the document stand and the discharge tray for restricting a position of the end of the read documents stacked on the discharge tray in a direction communicating the upper surface of the document stand with the discharge tray.

6. The image reader according to claim 1, wherein, when the restriction member is at the restriction position, the restriction member blocks off a space between an upper surface of the document stand and the discharge tray, and
   wherein the restriction member is arranged such that the restriction member leaves the space unobstructed.

* * * * *